I. L. DAVENPORT.
HAND TRUCK.
APPLICATION FILED AUG. 18, 1908.
910,360.
Patented Jan. 19, 1909.
2 SHEETS—SHEET 1.
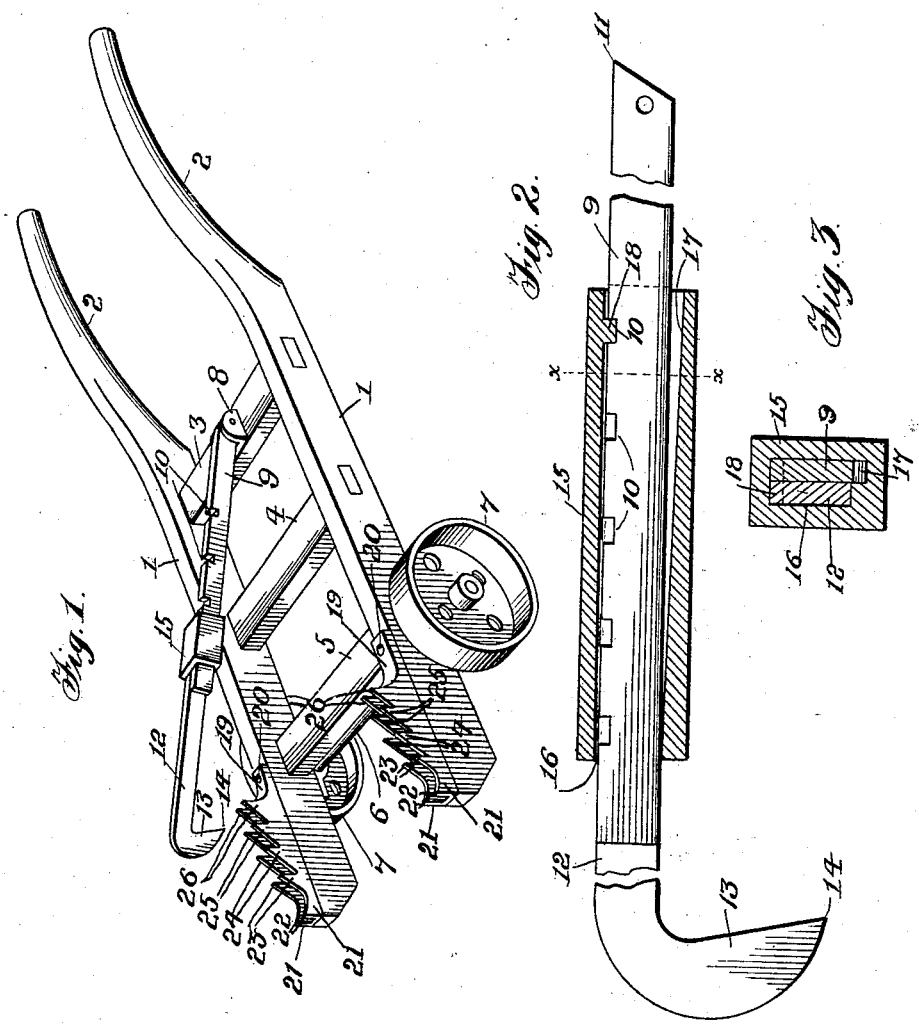
Witnesses
Thomas V. Sullivan
I. P. Hinds
Inventor
Isaac L. Davenport
By Connolly Bros,
Attorneys I. L. DAVENPORT.
HAND TRUCK.
APPLICATION FILED AUG. 18, 1908.
910,360.
Patented Jan. 19, 1909.
2 SHEETS—SHEET 2.
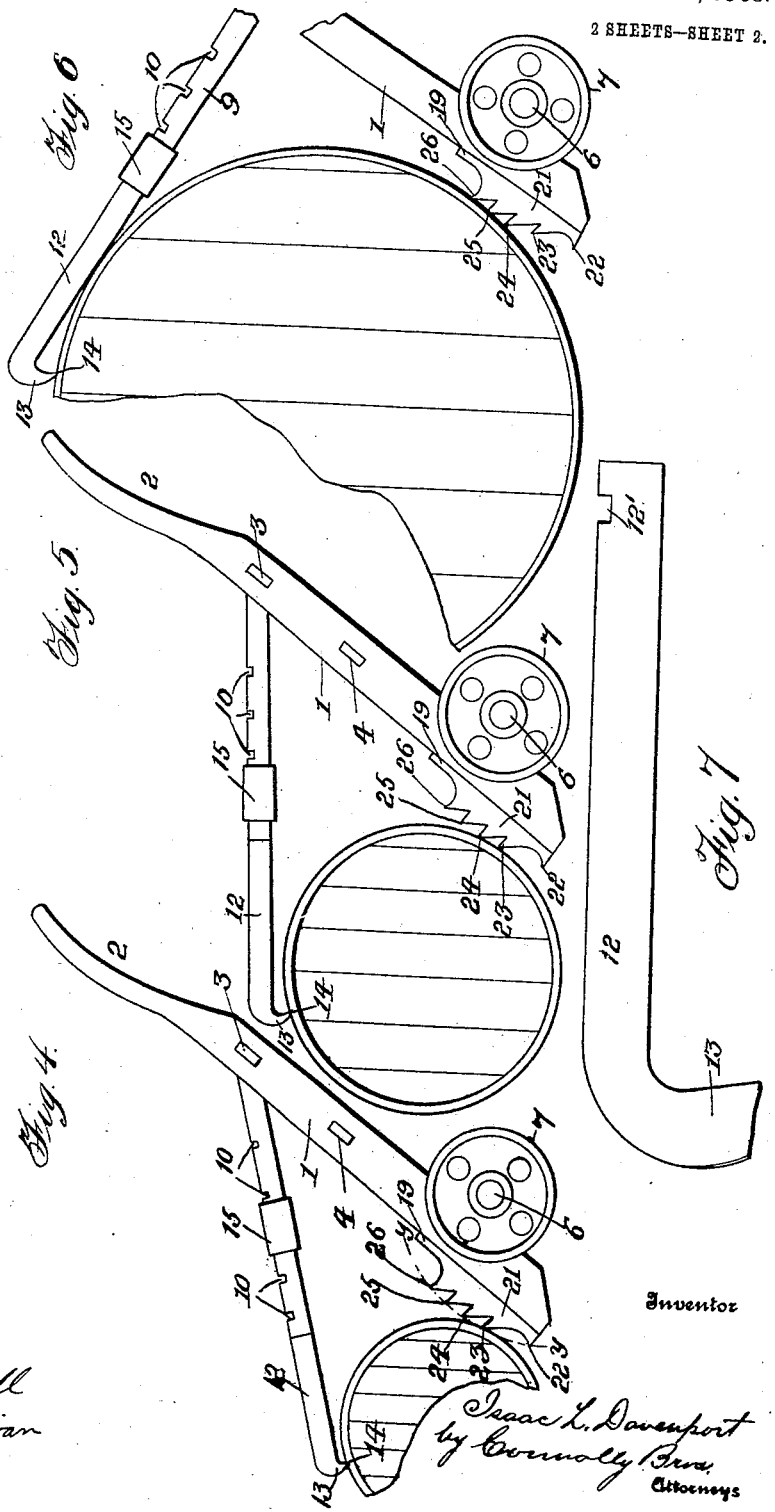
Witnesses
F. G. Campbell
Thomas V. Sullivan
Inventor
Isaac L. Davenport
by Connolly Bros.
Attorneys

UNITED STATES PATENT OFFICE.

ISAAC L. DAVENPORT, OF CAMDEN, NEW JERSEY, ASSIGNOR OF ONE-HALF TO FRANK A. CAVANAGH, OF ASHBOURNE, PENNSYLVANIA.

HAND-TRUCK.

No. 910,360.            Specification of Letters Patent.            Patented Jan. 19, 1909.

Application filed August 18, 1908. Serial No. 449,107.

*To all whom it may concern:*

Be it known that I, ISAAC L. DAVENPORT, a citizen of the United States, residing at Camden, in the county of Camden and State of New Jersey, have invented certain new and useful Improvements in Hand-Trucks, of which the following is a specification.

My invention has relation to hand trucks and relates in particular to hand trucks having an adjustable hook pivotally attached to the upper portion of the truck and having spurs at the lower portion of the truck to engage the article being transported.

The object of my invention is to simplify and improve the adjustable hook and the spurs heretofore employed and in carrying my invention into effect I provide a pivoted hook composed of two relatively adjustable members and a one-piece sleeve, the sleeve being mounted on and carried by one member of the hook and the other member of the hook telescoping in the sleeve, the sleeve and the two members of the hook being so constructed and arranged and provided with integral interlocking devices that the sleeve will permanently engage and be locked on one of the members of the hook and will successively engage the other member of the hook at a plurality of points along its length accordingly as the hook is to be lengthened or shortened.

In connection with my improved hook I provide an improved form of spurs for the lower end of the truck, each spur being provided with two parallel rows of teeth, the points of the teeth being arranged on a curve so as to adapt the several teeth to separately engage cylindrical objects of different diameter.

In the accompanying drawing in which I have illustrated my improvement: Figure 1 is a perspective view of the complete truck. Fig. 2 is a longitudinal sectional view on an enlarged scale of the adjustable hook. Fig. 3 is a transverse sectional view on the line *x—x* of Fig. 2. Figs. 4, 5 and 6 are side elevations of the truck, showing the manner in which it is used in loading cylindrical objects of different size. Fig. 7 is a side elevation of one member of the hook.

The body of the truck comprises the side bars 1 having handles 2, and cross bars, 3, 4, 5. An axle 6 is mounted near the lower ends of the side bars 1 and carries the wheels 7, these parts being of the usual or any desired form. Upon the upper cross bar 3 is fixed a bracket 8 to which is pivotally attached one member 9 of the adjustable hook. This member 9 is composed of a flat bar having notches 10 on its upper edge and having its inner end beveled off at an obtuse angle so that the upper corner 11 will engage the base of the bracket 8 and limit the upward movement of the hook. The second member of the hook designated 12, is of the same size and form in cross section as the member 9 and terminates at its outer end in a downwardly extending tooth 13 having a single engaging point 14. The member 12 has a single notch 12′ on its upper edge near its inner end and a sleeve 15 is fitted on the member 12, said sleeve being formed with a rectangular bore 16 extending through the sleeve from end to end, one-half of the said bore being of even height throughout while the other half has its lower surface downwardly inclined from the outer to the inner end of the sleeve as shown at 17, and a rib 18 crosses the bar at its upper side near the inner end of the sleeve and fits in the single notch 12′ in the upper edge of the member 12, which latter is arranged in that half of the bore which is of even height throughout and is retained in position by the other member 9 of the hook, which lies along side of member 12, being located in that half of the bore of the sleeve which has the inclined bottom 17. The member 12 of the hook is intended to remain in stationary position in and relatively to the sleeve, but it can be readily removed for repair or replacement if damaged or worn, by sliding the sleeve off of member 9, then moving member 12 over to the side of the bore previously occupied by member 9 and then tilting the sleeve so as to take the rib out of the notch 12′ in the edge of member 12 and then drawing that member out of the sleeve.

When the truck is in use the hook may be lengthened or shortened by simply tilting the member 12 and the sleeve downwardly so as to raise the rib 18 out of the particular notch in member 9 with which it is at that time engaged and then sliding the sleeve along member 9 in one direction or the other to the desired extent and then, after the tooth 13 has been brought to the proper point on the article to be loaded on the truck, allowing the sleeve to drop so as to cause the rib to engage the nearest notch in member 9. This adjustment of the hook will be made to cause the hook to engage objects of different size and in this connection the improved form of spur device shown in the drawing and which I will now describe coacts with the extensible hook and renders easy the rapid and safe handling of objects of various sizes and shapes.

The spur devices of which there are two, one at the lower end of each side bar, are each composed of a base 19 secured to the side bar by bolts 20 and having two vertical side pieces 21 the lower end of each side piece terminating in a spur or tooth 22 and the edge of each side piece being formed with a series of spurs or teeth 22, 23, 24, 25, 26. These spurs or teeth 22, 23, 24, 25, 26 are arranged on a curved line shown at $y$—$y$ in Fig. 4 and this arrangement facilitates the loading of articles of various size; for instance and as shown in Fig. 4, a small cylindrical article such as a small keg will be engaged by the tooth or spur 23, the truck being as shown at a more acute angle to the ground than where a large article is being loaded. Where, as shown in Fig. 5, a larger article is being loaded the tooth 24 will engage the same, the truck being held at a more acute angle to the ground than in Fig. 4 and where a very much larger article is being loaded the truck will be brought up to the article at a still more acute angle the article being then, and because of its large diameter engaged by the two teeth 25, 26. In each case the hook is adjusted in length as before described so as to engage the article being loaded at a proper point.

Where it is desired to load square articles, such as boxes or other articles which have an edge or corner close to the ground, the tooth 22 is inserted under the edge or corner and, the article being engaged by the tooth 13 of the hook and then raised off the ground and supported on the truck by depressing the handles 2.

I claim:

1. In a hand truck, an adjustable hook comprising two members, a sleeve carried by one member and having a bore to receive the other member, one member being movable lengthwise in the sleeve and being formed with a series of notches, and means disposed wholly within the bore of the sleeve to engage said notches successively.

2. The combination with a truck body of an extensible hook comprising a member having means for engaging articles to be loaded on the truck, a sleeve carried by said member and having a bore with a part of one wall inclined, and a projection in said bore, a second member pivotally attached to the body of the truck and having a series of notches, said second member telescoping in said sleeve and said rib engaging said notches successively to hold said second member against lengthwise movement in the sleeve.

3. The combination with a truck body, of a hook member having a series of notches, a sleeve having a bore adapted to receive said member and permit of lateral movement of the sleeve relatively to the said member, a projection within said sleeve adapted to be engaged with and disengaged from one of said notches by a lateral movement of the sleeve and a second hook member connected with the sleeve.

4. The combination with a truck body of a hook member pivotally attached to the truck body, a sleeve having a bore, one portion of the bore being of even height throughout its length, the other portion of the bore having an inclined bottom, a rib arranged in said bore, a hook member arranged in that portion of the bore which is of even height, said member having a notch engaged by said rib, a second hook member telescoping in said sleeve and having a series of notches adapted to be successively engaged by said rib.

5. The combination with a truck body and a pivoted hook carried by said truck body, of a spur device carried by the truck body and comprising a base having a terminal spur and a plurality of teeth disposed on a curved line, said teeth projecting at an angle opposite to the angle of said spur.

In testimony whereof I have affixed my signature, in presence of two witnesses.

ISAAC L. DAVENPORT.

Witnesses:
   CHAS. B. CONNOLLY,
   BLANCHE STAPLES.